(12) United States Patent
Hwang et al.

(10) Patent No.: US 10,931,787 B2
(45) Date of Patent: Feb. 23, 2021

(54) METHOD OF HANDLING MULTIPLE FORWARDING INFORMATION BASE SYNCHRONIZATION FOR NETWORK SWITCH STACKING SYSTEM USING CENTRAL LEARNING

(71) Applicant: Realtek Semiconductor Corp., HsinChu (TW)

(72) Inventors: Chen-Kuo Hwang, Hsinchu (TW); Jui-Chang Tsao, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/364,200

(22) Filed: Mar. 26, 2019

(65) Prior Publication Data
US 2020/0076921 A1    Mar. 5, 2020

(30) Foreign Application Priority Data
Aug. 28, 2018  (TW) .................................. 107129956

(51) Int. Cl.
*H04L 29/08* (2006.01)
*H04L 12/24* (2006.01)
*H04L 12/775* (2013.01)
*H04L 29/06* (2006.01)

(52) U.S. Cl.
CPC ............ *H04L 67/34* (2013.01); *H04L 41/044* (2013.01); *H04L 45/583* (2013.01); *H04L 69/28* (2013.01)

(58) Field of Classification Search
CPC ......... H04L 67/34; H04L 43/04; G06N 20/00; G06F 17/18
USPC ........................................................ 709/203
See application file for complete search history.

(56) References Cited

U.S. PATENT DOCUMENTS

| | | | |
|---|---|---|---|
| 2003/0169734 A1* | 9/2003 | Lu | H04L 49/351 370/386 |
| 2009/0094354 A1 | 4/2009 | Rastogi | |
| 2016/0352622 A1* | 12/2016 | Gautam | H04L 49/201 |

FOREIGN PATENT DOCUMENTS

| TW | I233734 | 6/2005 |
|---|---|---|
| TW | 200531478 | 9/2005 |

\* cited by examiner

*Primary Examiner* — David R Lazaro
*Assistant Examiner* — Zia Khurshid
(74) *Attorney, Agent, or Firm* — Winston Hsu

(57) ABSTRACT

A method of forwarding information base synchronization for a network switch stacking system includes transmitting by at least one slave network switch at least one change event to a master network switch, generating by the master network switch a change confirmation to the at least one slave network switch when a master forwarding information base is determined to be necessarily updated by the master network switch according to the at least one change event, and updating by the at least one slave network switch at least one slave forwarding information base according to the change confirmation, wherein the at least one change event includes at least one of a new learn event, a port move event, a regular port aging out event, a logic aggregation update aging time event.

7 Claims, 6 Drawing Sheets

METHOD OF HANDLING MULTIPLE FORWARDING INFORMATION BASE SYNCHRONIZATION FOR NETWORK SWITCH STACKING SYSTEM USING CENTRAL LEARNING

BACKGROUND OF THE INVENTION

1. Field of the Invention

The present invention discloses a method of handling multiple forwarding information base synchronization, and more particularly, to a method of handling multiple forwarding information base synchronization for network switch stacking system using central learning.

2. Description of the Prior Art

A network switch system or a network switch stacking system may be established by connecting multiple network switches to extend network ports to increase data throughput. The network switch stacking system behaviors the same like single network switch to realize any functions of single network switch, such as package forwarding, port aggregation, port mirroring, and so on. In the network switch stacking system with high bandwidth and multiple ports, when the system operating bandwidth cannot cover the overall bandwidth of network system, a FIB (forwarding information base) of the network switch may be divided into multiple planes, and each of the planes corresponds to a sub-FIB. The FIB is also known as a forwarding table or a MAC (media access control) table.

There are several methods for handling FIB synchronization such as: individual learning, ingress learning, individual and central learning, and change event learning. However, there are issues for the abovementioned methods waited to be solved. For example, there are several difficulties in managing multiple forwarding information base, synchronization delay, repeatedly change event transmission, change event missing and unable to support multiple port aggregation update.

Therefore, there is a need to provide a method of handling multiple forwarding information base synchronization for the network switch stacking system.

SUMMARY OF THE INVENTION

It is therefore an objective of the present invention to provide a method of handling multiple forwarding information base synchronization for network switch stacking system using central learning.

The present invention discloses a method of forwarding information base synchronization, for a network switch stacking system, the network switch stacking system includes at least one slave network switch and a master network switch. The method comprises the at least one slave network switch transmitting at least one change event to the master network switch; the master network switch generating a change confirmation to the at least one slave network switch when the master network switch determines that a master forwarding information base of the master network switch needs to be updated according to the at least one change event; and the at least one slave network switch updating at least one slave forwarding information base of the at least one slave network switch according to the change confirmation; wherein the at least one change event comprises at least one of a new learn event, a port move event, a regular port aging out event and a logic aggregation update aging time event.

The present invention further discloses a method of forwarding information base synchronization, utilized in a network switch, the network switch comprises a MAC engine, at least one slave IPP (ingress packet processor), at least one slave forwarding information base, a master IPP and a master forwarding information base. The method comprises the at least one slave IPP and the master IPP transmitting at least one change event to the MAC engine; the MAC engine determining whether the at least one change event is a logic aggregation update aging time event when the MAC engine determines that the master forwarding information base needs to be updated according to the at least one change event; the MAC engine notifying the master IPP to update an aging information of the master forwarding information base when the MAC engine determines that the at least one change event is the logic aggregation update aging time event; and the MAC engine changing the at least one slave forwarding information base and the master forwarding information base according to the at least one change event when the MAC engine determines that the at least one change event is not the logic aggregation update aging time event; wherein the at least one change event comprises at least one of a new learn event, a port move event, a regular port aging out event and the logic aggregation update aging time event.

The present invention utilizes central learning, the master network switch determines the change event, and the master network switch broadcasts the determined change event to the slave network switch. In the network switch stacking system, the present invention chooses a master network switch having a master forwarding information base, or chooses a master forwarding information base from a network switch having multiple forwarding information bases. When the master network switch and the slave network switch have detected that a forwarding information base needs to be updated (e.g., a new learn event, an aging out event, a port move even, or a LAG (Logical Aggregate) port update aging even), all the network switches transmit a package including database change data to the master network switch. When the master network switch determines that the change data can be written in the master forwarding information base, then the master network switch broadcasts the determined change package to all the network switches in the stacking system. Therefore, all the network switches may write the data of the determined change package into their own forwarding information bases.

These and other objectives of the present invention will no doubt become obvious to those of ordinary skill in the art after reading the following detailed description of the preferred embodiment that is illustrated in the various figures and drawings.

DETAILED DESCRIPTION

Currently, every network switch can support a function of automatic learning and update. When the network switch has detected any one of a new learn event, a port move event, an aging out event, and a logic aggregation update aging time event, automatic update for forwarding information base will be triggered.

The new learn event is to record a source MAC (Media Access Control) address and a network port name of a new package in the forwarding information base, and record a LAG (Logical Aggregate) port name of the new package if it is one of aggregated ports. The port move event is to change its network port name when the source MAC address of the package had existed in the forwarding information base. The regular port aging out event is to remove the source MAC address whose aging time has reached to zero, to save space of the forwarding information base. The LAG port update aging time event may be abbreviated an LAG port update event. Due to the LAG port is formed by aggregating multiple network ports, these network ports may be controlled by different network switches or different forwarding engines of a single network switch, and therefore the aging time of the LAG port needs to be synchronized.

Figure 1:
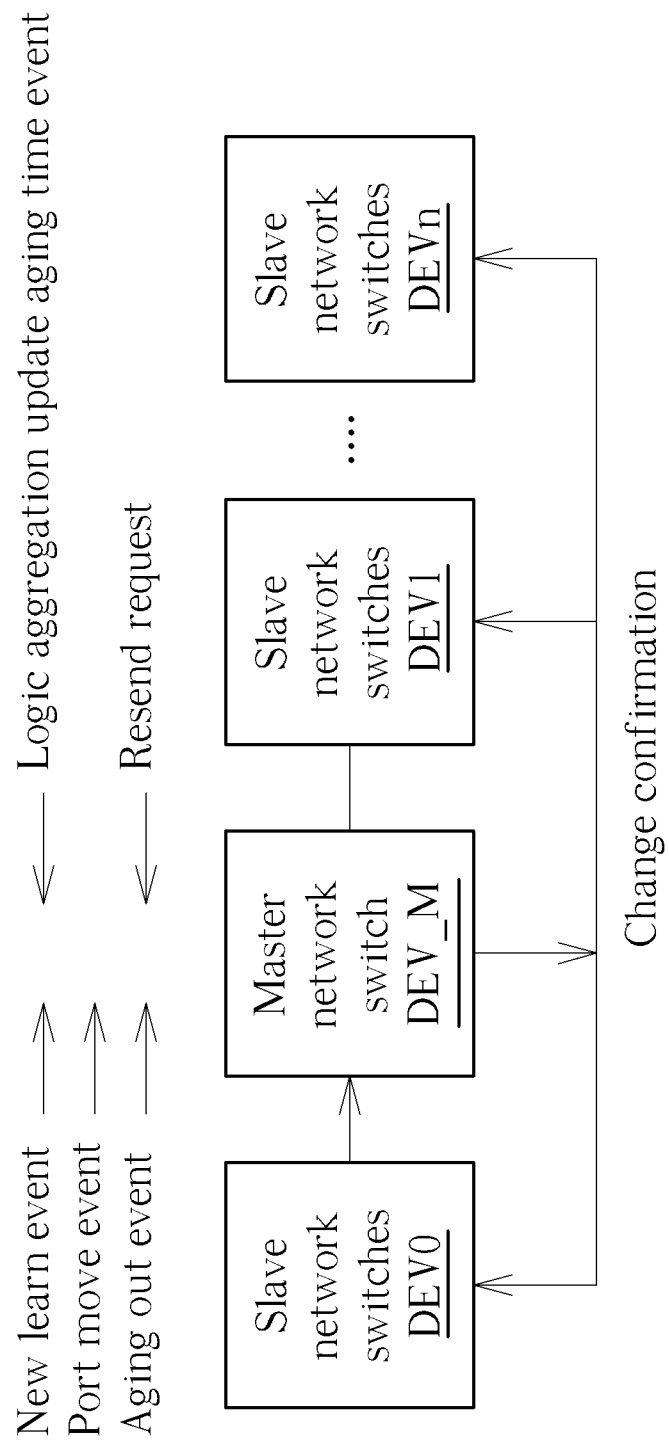
FIG. 1 is a schematic diagram of a network switch stacking system according to an embodiment of the present invention.

FIG. 1 is a schematic diagram of a network switch stacking system 1 according to an embodiment of the present invention. The network switch stacking system 1 includes a master network switch DEV_M and multiple slave network switches DEV0~DEVn. The master network switch DEV_M is connected to the slave network switches DEV0~DEVn, and configured to determine whether to update a central database according to at least one change event, and transmit a change confirmation to the slave network switches DEV0~DEVn after the central database has been updated. The multiple slave network switches DEV0~DEVn correspond to multiple slave databases, and configured to update the corresponding slave databases according to the change confirmation.

In one embodiment, the master network switch DEV_M and the multiple slave network switches DEV0~DEVn are able to detect receive package status to generate the change event. In one embodiment, the change event may be one of a new learn event, a port move event, a regular port aging out event and a LAG port update event.

In one embodiment, the change event transmitted by the slave network switches DEV0~DEVn and the master network switch DEV_M may be scheduled in the master network switch DEV_M. When confirmation change event is writeable into a central forwarding information base of the master network switch DEV_M, the master network switch DEV_M records this change event as a change confirmation, and then transmits this change confirmation to all the slave network switches DEV0~DEVn, to request all the slave network switches DEV0~DEVn to change their slave databases.

When there are multiple change confirmations, the master network switch DEV_M may add serial numbers or ID (identification) number to the change confirmations, and the slave network switches DEV0~DEVn may record the serial number of the last received change confirmation. When a new serial number of an incoming change confirmation is out of order, the slave network switches DEV0~DEVn may transmit a resend request to the master network switch DEV_M, so as to request the missing package. Therefore, within a reservation time of the change confirmation, the master network switch DEV_M may transmit the change confirmation again according to the resend request. For example, the master network switch DEV_M simultaneously transmit the change confirmation to the physical port and a software processor (e.g., a built in processor configures a memory space to store the change confirmation), and a package resend event transmitted by the slave network switches DEV0~DEVn may be guided to the software processor to give response to the package resend event, which is not limited.

In one embodiment, the new learn, the port move, the normal port aging out and the LAG port update event may be transmitted by the slave or master network switch, and the master network switch DEV_M may not add serial numbers to the change confirmation, to reduce stacking bandwidth and practical complexity, which is not limited. Those skilled in the art may make conditions and timings for adding the serial numbers according to practical requirements.

In short, the network switch stacking system 1 of the present invention uses central learning, the master network switch DEV_M determines the change event (to be one of the new learn, the port move, the normal and LAG port aging out, and the LAG port update event), and broadcasts the determined change event to the slave network switches DEV0~DEVn, so as to synchronize all forwarding information bases in the network switch stacking system 1. In addition, the master network switch DEV_M may add serial numbers and temporally keep the change confirmation, so the slave network switches DEV0~DEVn may discover missing package to send resend request to the master network switch DEV_M, which is not limited.

Figure 2:
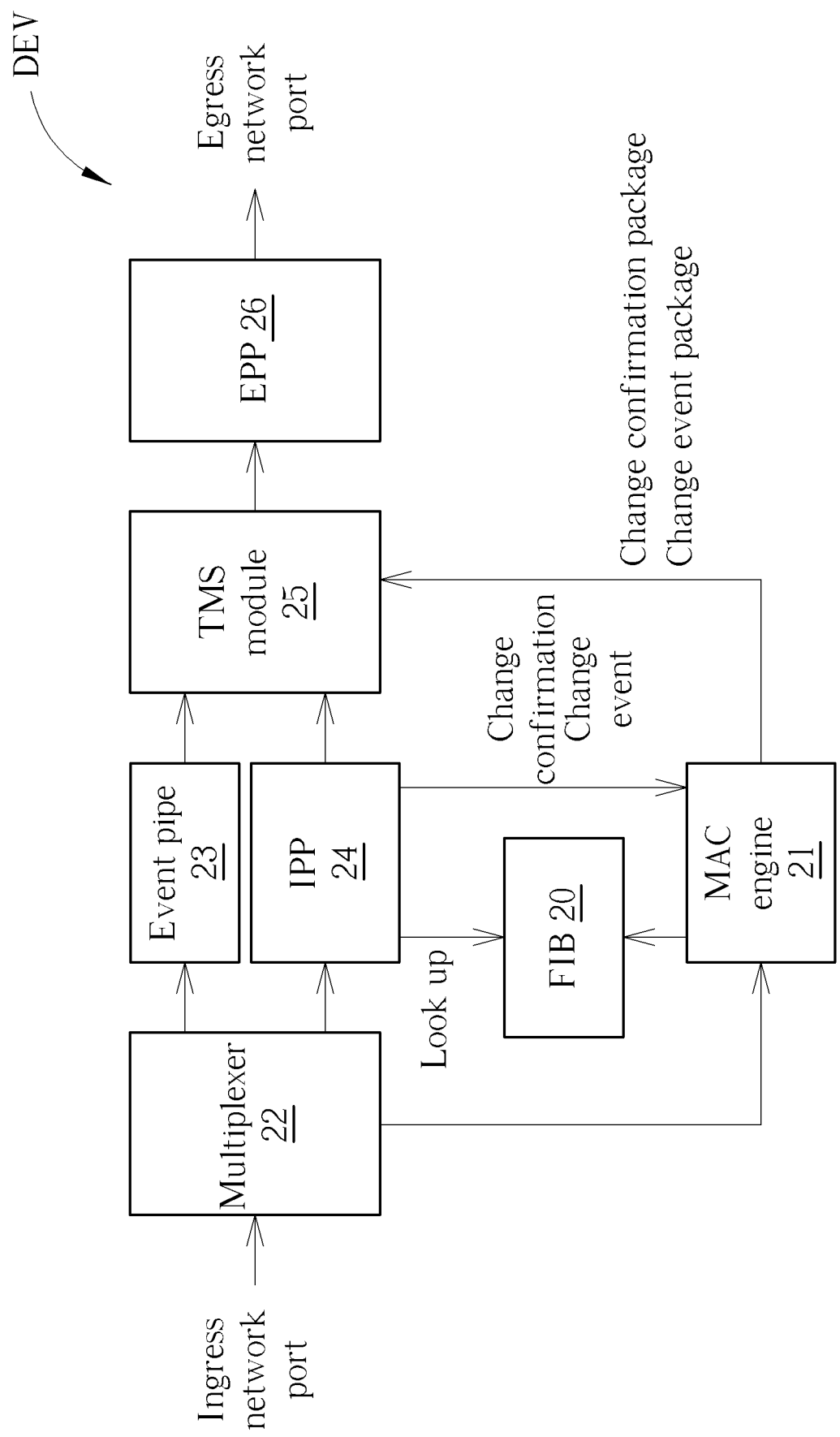
FIG. 2 is a functional block diagram of the network switch in FIG. 1 according to an embodiment of the present invention.

FIG. 2 is a functional block diagram of the network switch DEV according to an embodiment of the present invention. The network switch DEV includes a forwarding information base 20, a MAC engine 21, a multiplexer 22, an event pipe 23, an IPP (Ingress packet processor) 24, a TMS (Traffic management and scheduling) module 25 and an EPP (Egress packet processor) 26. The slave network switches DEV0~DEVn and the master network switch DEV_M are structurally identical, hereinafter takes the network switch DEV for example.

When the network switch DEV is one of the slave network switches DEV0~DEVn, the following describes operations of detecting and transmitting the change event to the master network switch DEV_M. When the multiplexer 22 determines that the received package is an event package, the event package is sent to the event pipe 23 to perform queuing, and the EPP 26 may transmit the event package after the event package is scheduled by the output network port TMS module 25. On the other hand, when the multiplexer 22 determines that the received package is a normal package, the normal package is sent to the IPP 24 and the MAC engine 21. The IPP 24 may look up whether the MAC address and stacking port information have been stored in the forwarding information base 20, to determine whether to update the forwarding information base 20. When the IPP 24 determines that there is a need to update the forwarding information base 20, the change event (e.g., one of the new learn, the port move, the normal port aging out and the LAG port update event) is generated to the MAC engine 21. The MAC engine 21 may generate a change event package to the TMS module 25 according to the change event. The EPP 26 may send the change event package to the output network port after it is scheduled by the TMS module 25, so as to transmit the change event to the master network switch DEV_M.

When network switch DEV is the master network switch DEV_M, the following describes operations of the network switch DEV receiving a change event and transmitting a change confirmation to the slave network switches DEV0~DEVn. When the multiplexer 22 determines that the received package is a change event package, the change event package is sent to the MAC engine 21, and the MAC engine 21 updates the forwarding information base 20 according to the change event package. When the forwarding information base 20 has updated, the MAC engine 21 generates the change confirmation to the TMS module 25 according to the change event package. Until the TMS module 25 has performed scheduling, the EPP 26 sends the change confirmation to the output network port, to transmit the change confirmation to the slave network switches DEV0~DEVn.

When the network switch DEV is the master network switch DEV_M, the following describes operations of detecting change event and transmitting change confirmation to the slave network switches DEV0~DEVn. When the multiplexer 22 determines that the received package is a normal package, the received package is sent to the IPP 24 and the MAC engine 21. The IPP 24 determines whether the source MAC address has recorded in the forwarding information base 20 according to the source MAC address of the normal package, to determine whether to generate the change event. If the change event is generated, the MAC engine 21 updates the forwarding information base 20 according to the change event (the new learn, the aging out, the port move, or the LAG port update event). When forwarding information base 20 has updated, the MAC engine 21 generates the change confirmation to the TMS module 25 according to the change event. The EPP 26 outputs the change confirmation to the output network port after the change confirmation is scheduled by the TMS module 25, so as to transmit the change confirmation to the slave network switches DEV0~DEVn.

When the network switch DEV is the slave network switches DEV0~DEVn, the following describes operations of receiving change confirmation to perform database update. When the multiplexer 22 determines that the received package is a change confirmation, the change confirmation is sent to the MAC engine 21 and the event pipe 23, the MAC engine 21 updates the forwarding information base 20 according to the change confirmation; meanwhile, the TMS module 25 and the EPP 26 forward the change confirmation to other slave network switches. In one embodiment, when the multiplexer 22 determines that the received package is a change confirmation caused by a resend request, and the network switch DEV itself is the slave network switch which sends the resend request, the resend change confirmation is transmitted to the MAC engine 21 or a built in processor (not shown in FIG. 2) to update the forwarding information base 20. When the multiplexer 22 determines that the received package is change confirmation caused by a resend request, but and the network switch DEV itself is not the slave network switch which sends the resend request, the resend change confirmation is transmitted to the event pipe 23, the TMS module 25 and the EPP 26 to perform forwarding.

Since an amount of data of a change event is usually low and the change event occasionally happens, in order to avoid taking network bandwidth, the MAC engine 21 may limit a data payload of a generated event package to reduce practical complexity. Also, the MAC engine 21 may avoid keeping the change event in queuing for too long to cause long synchronization delay time. In one embodiment, the MAC engine 21 may encapsulate multiple change events into a single change event package within a tolerable range of a data payload, to use single package to transmit multiple change events. In addition, the MAC engine 21 may encapsulate at least one change event into a single change event package within a tolerable range of a change event aging time. Similarly, the MAC engine 21 may encapsulate multiple change confirmation into a single change confirmation within a tolerable range of a data payload, to use single package to transmit multiple change confirmation. In addition, the MAC engine 21 may encapsulate the at least one change confirmation into single change confirmation within a tolerable range of a change event aging time.

Note that in order to avoid triggering same new learn events or same port move events, the network switch of the present invention requires an event filter configured to filter out the same new learn events and the same port move events.

Figure 3:
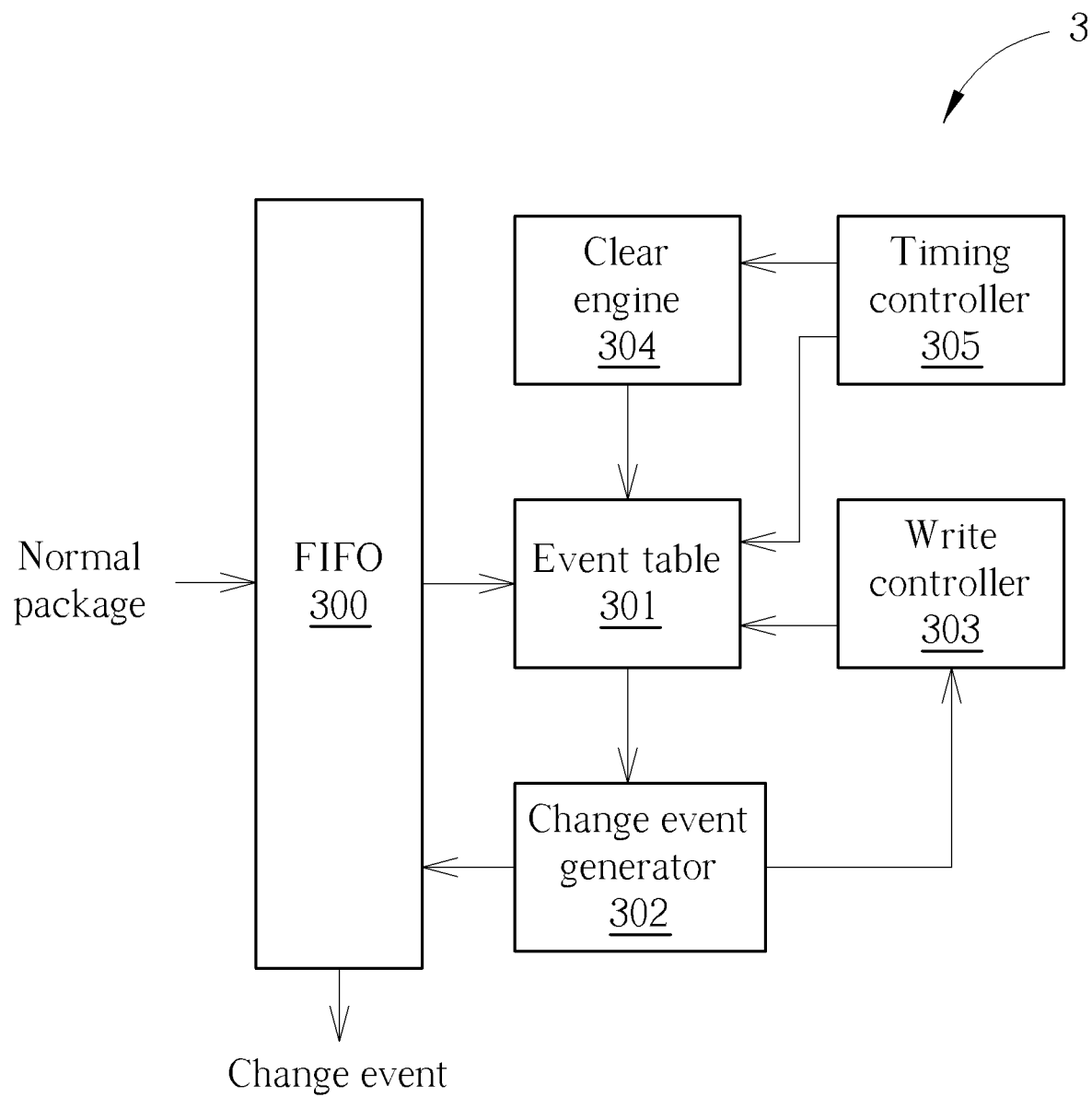
FIG. 3 is a functional block diagram of an event filter according to an embodiment of the present invention.

FIG. 3 is a functional block diagram of an event filter 3 according to an embodiment of the present invention. The event filter 3 may be disposed in the network protocol control plane 24, and configured to determine whether to generate a change event to the MAC engine 21. The event filter 3 includes an input output module 300, an event table 301, a change event generator 302, a write controller 303, a clear engine 304, and a timing controller 305. In one embodiment, the event table 301 may be a BCAM (Binary Content Addressable Memory).

The event filter 3 may be utilized in both the master and slave network switch, the present embodiment takes the network switches DEV0~DEVn using the event filter for example. The input output module 300 may send the normal package to the event table 301 to perform table look-up. If the event table 301 has not recorded the source MAC address of the package (i.e., new learn event), the write controller 303 may write the source MAC address, the network port name and the write time into the event table 301. The change event generator 302 may generate a change event to the input output module 300 to send the change event to the MAC engine 21, the TMS module 25, EPP module 26 and the master network switch DEV_M. If the event table 301 has recorded the source MAC address of the package with different network port name (i.e., port move event), the write controller 303 may write the new network port name and the write time into the event table 301, and the change event generator 302 may generate a change event to the input output module 300, to send the change event to the MAC engine 21, the TMS module 25, the EPP module 26, and the master network switch DEV_M. If event table 301 has recorded the source MAC address and network port name, the event table 301 does not rewrite the source MAC address and the network port name, and does not generate any change event to the MAC engine 21, so as to filter out the same new learn event and the same port move event.

The timing controller 305 is used for configuring an aging time for each piece of data of the event table 301, and the clear engine 304 is used for periodically scanning the aging time for each data of the event table 301. When the clear engine 304 has found that an aging time for a piece of data has count to zero, the piece of data will be deleted. Therefore, when the package source MAC address, the network port name and the corresponding change event recorded by the event table 301 have been deleted, but the slave network switch has not received the corresponding change confirmation, the next new package with the same source MAC address and the network port name may trigger a new change event (i.e., the new learn or the port move event).

Regarding the regular port aging out event, each piece of data in the forwarding information base 20 corresponds to an age timer. When receiving the package transmitted by the source MAC device, the IPP 24 may update the age timer of the source MAC address recorded in the forwarding information base 20. The age timer may automatically counting down, when the age timer corresponding to the source MAC address has counted down to zero, the IPP 24 is triggered to transmit the regular port aging out event.

In one embodiment, when the IPP 24 determines that the aging out event is the regular port aging out event, the aging out event is not sent to the event filter 3 to reduce the overhead of the event filter 3.

Regarding an aging out event and an aging update event of a LAG port, in this embodiment, all the slave network switches DEV0~DEVn are in charge of providing update information of the LAG port aging time, and the master network switch DEV_M transmits the aging change confirmation and the aging out event of the LAG port to the slave network switches DEV0~DEVn according to the update information. Whenever each of the slave network switches DEV0~DEVn has received source MAC address of any package, it has to update the source MAC address timer (including a source MAC address timer of the LAG port) in the forwarding information base 20. When the slave network switches DEV0~DEVn have done the period checking of the forwarding information base 20 and discovered that the age timer of the LAG port has been updated, the slave network switches DEV0~DEVn transmit the LAG aging update event to the master network switch DEV_M. The master network switch DEV_M may update its forwarding information base 20 according to the LAG aging update event. When the LAG port age timer recorded by the master network switch DEV_M has counted down to zero, the master network switch DEV_M may transmit the aging out event and the corresponding change confirmation of the LAG port to all the network switches. In addition, when the IPP 24 determines that the incoming package is the LAG port update event, the LAG port update event is not sent to the event filter 3, to reduce overhead of the event filter 3.

Figure 4:
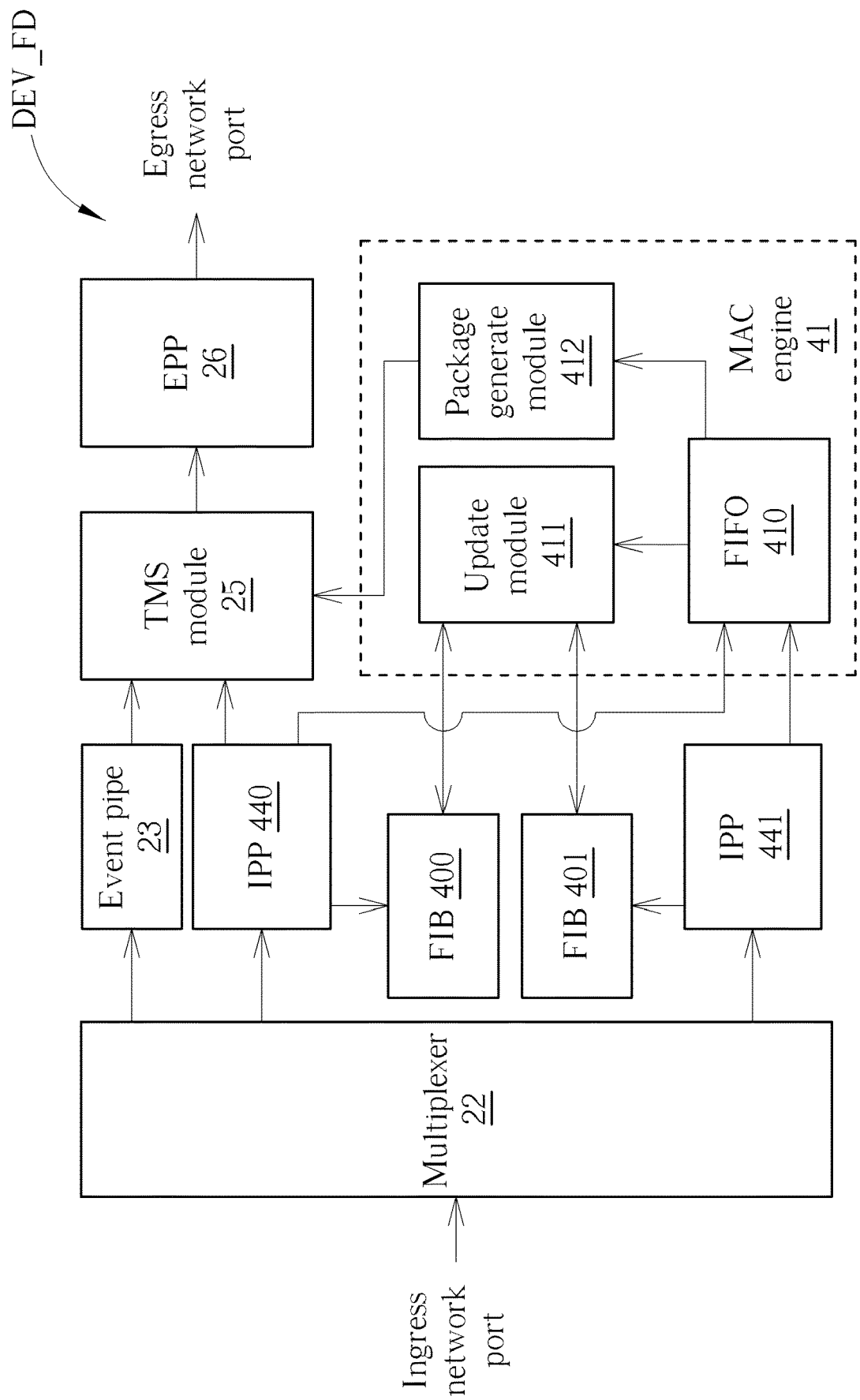
FIG. 4 is a functional block diagram of a network switch according to an embodiment of the present invention.

FIG. 4 is a functional block diagram of a network switch DEV_FD according to an embodiment of the present invention. The network switches DEV_FD and DEV are structurally similar, and same elements are denoted with same symbols. The network switch 4 includes forwarding information bases 400 and 401, a MAC engine 41, the multiplexer 22, the event pipe 23, IPPs 440 and 441, the TMS module 25, and the EPP 26. The MAC engine 41 includes a FIFO (First In First Out) module 410, an update module 411, and a package generate module 412.

In one embodiment, the IPPs 440 and 441 may detect change events for fixed physical port (such as the new learn, the port move, and the regular port aging out event) and send them to the MAC engine 41, and then the FIFO module 410 may perform queuing and scheduling to them. The update module 411 may write data including a source MAC address, a port name and an age timer of the received package into the forwarding information bases 400 and 401 according to the change event. When writing has finished, the forwarding information bases 400 and 401 may transmit a change confirmation to the update module 411, to perform database synchronization in the network switch DEV_FD.

In one embodiment, one of forwarding information base 400 and 401 may be a master forwarding information base, and the other may by a slave forwarding information base. For example, the forwarding information base 400 may be a master forwarding information base, and the forwarding information base 401 may be a slave forwarding information base.

Regarding the change event for the fixed physical port, the slave IPP 441 and the master IPP 440 may detect the change event, to send the change event to the FIFO module 410 and the update module 411, so as to perform database synchronization in the forwarding information bases 400 and 401.

Regarding aging out events and aging update events for a LAG port, the slave IPP 441 may look up the forwarding information base 401 to provide information associated with the age timer of the LAG port to the master IPP 440, to update the aging timer of the master forwarding information base 400. The master IPP may periodically scan the forwarding information base 400, and trigger the LAG port aging out event when found that the aging timer of the LAG port has counted down to zero, the corresponding event will be sent to the MAC control engine 41, and the forwarding information bases 400 and 401 are simultaneously updated, so as to perform database synchronization in the network switch DEV_FD.

In one embodiment, when the network switch DEV_FD with multiple forwarding information bases 400 and 401 is utilized in the network switch stacking system 1, a multi-layered master-slave structure is formed. Regarding aging out and aging time update events for the LAG port, given that the network switch DEV_FD is one of the slave network switches DEV0~DEVn in the network switch stacking system 1, the slave IPP 441 may look up from the forwarding information base 401, to provide information of the age timer of the LAG port to the master IPP 440. After the master IPP 440 acquires the latest LAG port age timer from the master forwarding information base 400, the master IPP 440 transmits the aging update event of the LAG port to the FIFO module 410 and the package generate module 412. The package generate module 412 may generate the corresponding change event package to the TMS module 25, the EPP 26 and the master network switch DEV_M.

In one embodiment, given that the network switch DEV_FD is the master network switch DEV_M in the network switch stacking system 1, the slave IPP 441 may look up the forwarding information base 401, to provide information of the age timer of the LAG port to the master IPP 440. After the IPP 440 acquires the latest LAG port age timer from the master forwarding information base 400, the IPP 440 transmits the aging out event and the aging update event of the LAG port to the FIFO module 410 and the package generate module 412. The package generate module 412 may generate the corresponding change confirmation to the TMS module 25, the EPP 26 and the slave network switches DEV0~DEVn. Meanwhile, the update module 411 may update the forwarding information bases 400 and 401, to perform database synchronization in the network switch DEV_M.

Figure 5:
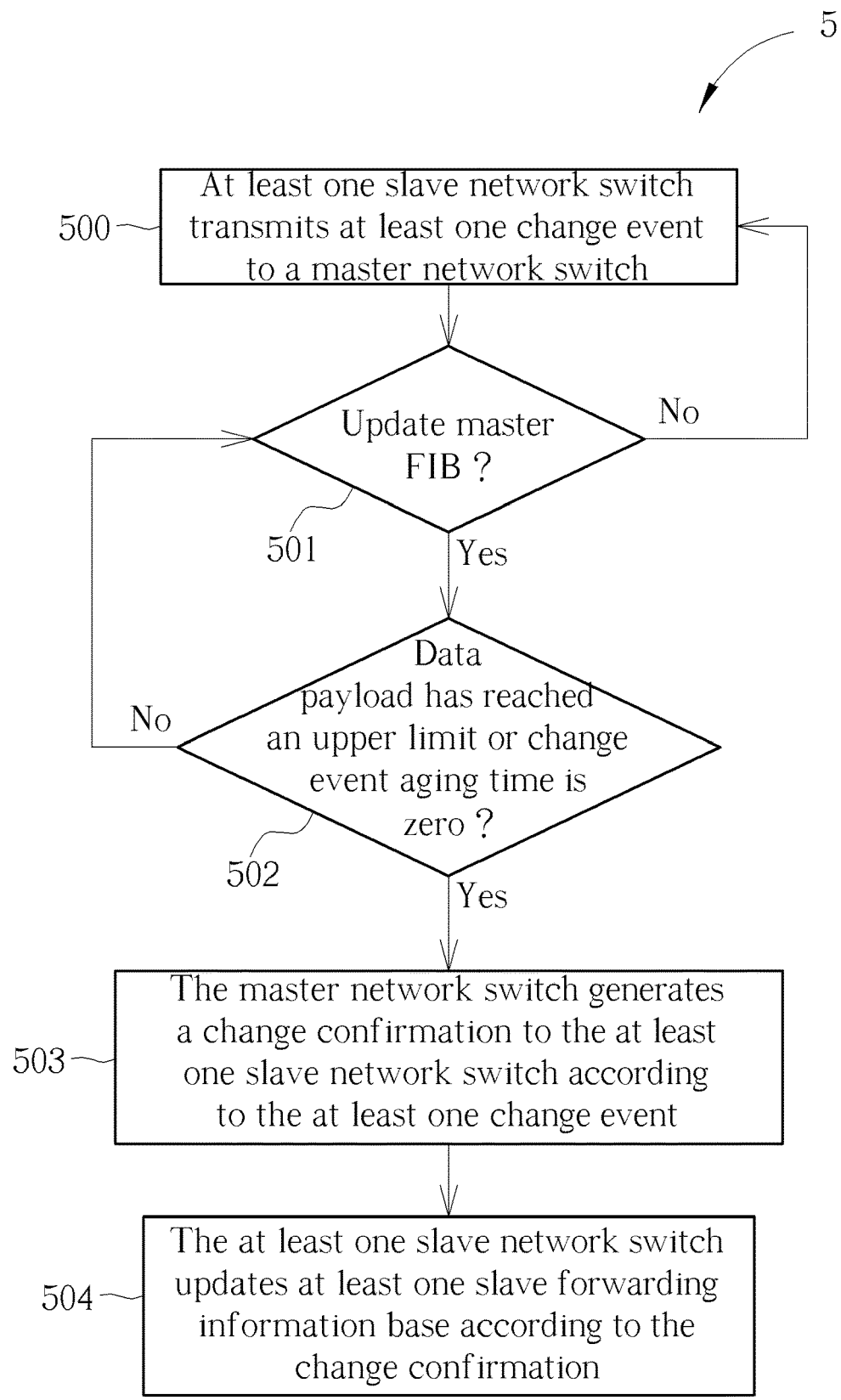
FIG. 5 is a flowchart of a process of forwarding information base synchronization according to an embodiment of the present invention.

Operations regarding the network switch stacking system 1 may be summarized into a process of forwarding information base synchronization 5, as shown in FIG. 5, the process of forwarding information base synchronization 5 includes the following steps.

Step 500: At least one slave network switch transmits at least one change event to a master network switch.

Step 501: The master network switch determines whether to update a master forwarding information base according to the at least one change event. Go to Step 502 if yes; return to Step 500 if no.

Step 502: The master network switch determines whether a data payload has reached an upper limit or whether a change event aging time is zero. Go to Step 503 if yes; return to Step 501 if no.

Step 503: The master network switch generates a change confirmation to the at least one slave network switch according to the at least one change event.

Step 504: The at least one slave network switch updates at least one slave forwarding information base according to the change confirmation.

Detailed operations regarding to the process of forwarding information base synchronization 5 may be obtained by referring to descriptions regarding FIG. 1, which is omitted.

Figure 6:
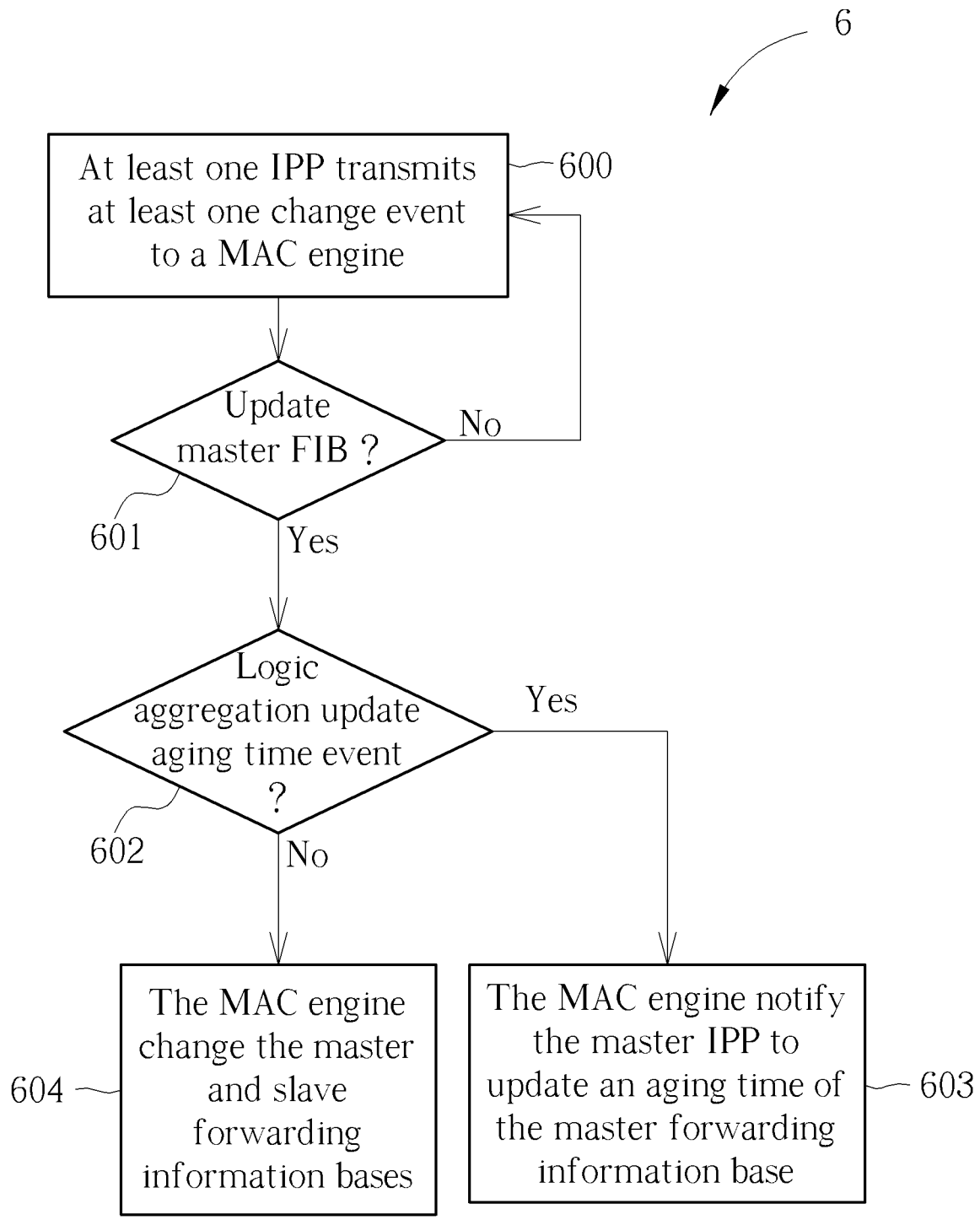
FIG. 6 is a flowchart of another process of forwarding information base synchronization according to an embodiment of the present invention.

Operations regarding the network switch DEV_FD may be summarized into a process of forwarding information base 6, as shown in FIG. 6, the process of forwarding information base 6 the following steps.

Step 600: At least one IPP transmits at least one change event to a MAC engine.

Step 601: The MAC engine determines whether to update a master forwarding information base? Go to Step 602 if yes; return to Step 600 if no.

Step 602: The MAC engine determines whether the at least one change event is a logic aggregation update aging time event? Go to Step 603 if yes; Go to Step 604 if no.

Step 603: The MAC engine notify the master IPP to update an aging time of the master forwarding information base.

Step 604: The MAC engine change the master and slave forwarding information bases.

Detailed operations regarding to the process of forwarding information base synchronization 6 may be obtained by referring to descriptions regarding FIG. 4, which is omitted.

To sum up, the network switch stacking system the present invention utilizes central learning, the master network switch determines the change event (the new learn, the aging out, the port move, or the LAG port update event), and the master network switch broadcasts the determined change event to the slave network switch, to perform synchronization to all the forwarding information base in the network switch stacking system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of forwarding information base synchronization, for a network switch stacking system, the network switch stacking system includes at least one slave network switch and a master network switch, wherein the method comprises:

the at least one slave network switch transmitting at least one change event to the master network switch; the master network switch generating a change confirmation to the at least one slave network switch when the master network switch determines that a master forwarding information base of the master network switch needs to be updated according to the at least one change event; and the at least one slave network switch updating at least one slave forwarding information base of the at least one slave network switch according to the change confirmation;

wherein the at least one change event comprises at least one of, a port move event and a regular port aging out event;

wherein a single change event package is encapsulated by multiple change events;

wherein when the master network switch determines that the master forwarding information base of the master network switch needs to be updated, and a data payload of the single change event package has reached an upper limit, the master network switch generates the change confirmation to the at least one slave network switch.

2. The method of claim 1, wherein the change confirmation corresponds to a serial identification number, further comprising:

when the at least one slave network switch determines that the serial identification number corresponding to the change confirmation is out of order, the at least one slave network switch transmitting a resend request to the master network switch; and within a reservation time of the change confirmation, the master network switch transmits the change confirmation to the at least one slave network switch according to the resend request.

3. The method of claim 1, further comprising:

when the at least one slave network switch determines that the at least one change event is the logic aggregation update aging time event, the at least one slave network switch transmitting the logic aggregation update aging time event comprising an age timer information of a LAG (Logical Aggregate) port;

the master network switch determining a LAG port aging out event of the LAG port according to the age timer information of the LAG port; and when the master network switch determines that the age timer information of the LAG port has counted to zero, the master network switch transmitting a LAG port aging out confirmation corresponding to the LAG port aging out event to the at least one slave network switch.

4. The method of claim 1, further comprising:

when the at least one slave network switch determines that the at least one change event is at least one of the new learn event or the port move event, the at least one slave network switch determining whether the new learn event or the port move event has been recorded in an event table;

when the at least one slave network switch determines that the new learn event or the port move event has not recorded in the event table, the at least one slave network switch transmitting the at least one change event corresponding to the new learn event or the port move event to the master network switch;

when the at least one slave network switch determines that the new learn event or the port move event has been recorded in the event table, and an age timer corresponding to the new learn event or the port move event has not counted to zero, the at least one slave network switch not transmitting the at least one change event corresponding to the new learn event or the port move event to the master network switch; and when the at least one slave network switch determines that the age timer corresponding to the new learn event or the port move event has counted to zero, the at least one slave network switch deleting the new learn event or the port move event from the event table.

5. The method of claim 4, further comprising:
when the at least one slave network switch has done period checking of the at least one slave forwarding information base and determines that the at least one change event is the regular port aging out event or the logic aggregation update aging time event, the at least one slave network switch not recording the regular port aging out event or the logic aggregation update aging time event in the event table.

6. A method of forwarding information base synchronization, utilized in a network switch, the network switch comprises a MAC engine, at least one slave IPP (ingress packet processor), at least one slave forwarding information base, a master IPP and a master forwarding information base, the method comprises: the at least one slave IPP and the master IPP transmitting at least one change event to the MAC engine; the MAC engine determining whether the at least one change event is a logic aggregation update aging time event when the MAC engine determines that the master forwarding information base needs to be updated according to the at least one change event; the MAC engine notifying the master IPP to update an aging information of the master forwarding information base when the MAC engine determines that the at least one change event is the logic aggregation update aging time event; and
the MAC engine changing the at least one slave forwarding information base and the master forwarding information base according to the at least one change event when the MAC engine determines that the at least one change event is not the logic aggregation update aging time event;
wherein the at least one change event comprises at least one, a port move event, and a regular port aging out event wherein a single change event package is encapsulated by multiple change events;
wherein when the master network switch determines that the master forwarding information base of the master network switch needs to be updated, and a data payload of the single change event package has reached an upper limit, the master network switch generates the change confirmation to the at least one slave network switch.

7. The method of claim 6, wherein when the MAC engine determines that the at least one change event is the logic aggregation update aging time event, further comprising:
the MAC engine transmitting the logic aggregation update aging time event to a master network switch;
wherein the network switch is a slave network switch if a network switch stacking system, and the network switch stacking system comprises the master network switch.

* * * * *